(12) United States Patent
Park et al.

(10) Patent No.: US 12,183,511 B2
(45) Date of Patent: Dec. 31, 2024

(54) ENERGY STORAGE DEVICE (71) Applicant: LS MATERIALS CO., LTD., Anyang-si (KR)

(72) Inventors: Kyeong Hoon Park, Anyang-si (KR); Jung Gul Lee, Anyang-si (KR)

(73) Assignee: LS MATERIALS CO., LTD., Anyang-si (KR)

( * ) Notice: Subject to any disclaimer, the term of this patent is extended or adjusted under 35 U.S.C. 154(b) by 95 days.

(21) Appl. No.: 17/799,167

(22) PCT Filed: Dec. 18, 2020

(86) PCT No.: PCT/KR2020/018627
§ 371 (c)(1),
(2) Date: Aug. 11, 2022

(87) PCT Pub. No.: WO2021/162229
PCT Pub. Date: Aug. 19, 2021

(65) Prior Publication Data
US 2023/0083879 A1 Mar. 16, 2023

(30) Foreign Application Priority Data

Feb. 14, 2020 (KR) ........................ 10-2020-0018227
Dec. 10, 2020 (KR) ........................ 10-2020-0172435

(51) Int. Cl.
*H01G 11/80* (2013.01)
*H01G 11/74* (2013.01)
(Continued)

(52) U.S. Cl.
CPC ............. *H01G 11/80* (2013.01); *H01G 11/74* (2013.01); *H01G 11/82* (2013.01);
(Continued)

(58) Field of Classification Search
CPC ........ H01G 11/80; H01G 11/84; H01G 11/74; H01G 11/82; H01G 4/35; H01G 2/02;
(Continued)

(56) References Cited

U.S. PATENT DOCUMENTS 6,579,640 B1 * 6/2003 Nagase ............... H01M 50/176
429/211
7,365,962 B2 * 4/2008 Miura .................... H01G 9/151
361/301.2
(Continued)

FOREIGN PATENT DOCUMENTS

CN 201294158 Y 8/2009
EP 1677322 A1 7/2006
(Continued)

OTHER PUBLICATIONS

International Search Report for related International Application No. PCT/KR2020/018627; action dated Aug. 19, 2021; (7 pages).
(Continued)

*Primary Examiner* — Michael P McFadden
(74) *Attorney, Agent, or Firm* — K&L Gates LLP (57) ABSTRACT

The present disclosure relates to an energy storage device comprising: a housing for accommodating an electrolyte; an electrode element accommodated inside the housing; a case coupled to one side of the housing; and an electrode terminal inserted into the case so as to be electrically connected to the electrode element, wherein the case comprises: a base part having a through-hole into which the electrode terminal is inserted; and a sealing part coupled to the base part so as to seal the space between the base part and the electrode terminal, and the sealing part includes a terminal sealing member located at the through-hole so as to come into close contact with the electrode terminal, thereby sealing the space between the base part and the electrode terminal.

11 Claims, 6 Drawing Sheets (51) Int. Cl.
  *H01G 11/82* (2013.01)
  *H01M 50/107* (2021.01)
  *H01M 50/131* (2021.01)
  *H01M 50/184* (2021.01)
  *H01M 50/188* (2021.01)
  *H01M 50/55* (2021.01)

(52) U.S. Cl.
  CPC ....... *H01M 50/107* (2021.01); *H01M 50/131* (2021.01); *H01M 50/184* (2021.01); *H01M 50/188* (2021.01); *H01M 50/55* (2021.01)

(58) Field of Classification Search
  CPC ............ H01G 2/06; H01G 4/224; H01G 9/08; H01G 9/10; H01G 11/78; H01M 50/107; H01M 50/131; H01M 50/184; H01M 50/55; H01M 50/188
  See application file for complete search history.

(56) References Cited

U.S. PATENT DOCUMENTS

| | | | |
|---|---|---|---|
| 2003/0124420 A1 | 7/2003 | Fong et al. | |
| 2004/0191612 A1* | 9/2004 | Akita | H01M 50/553 429/176 |
| 2006/0024573 A1* | 2/2006 | Yim | H01M 50/186 429/161 |
| 2011/0104562 A1* | 5/2011 | Byun | H01M 50/176 429/181 |
| 2013/0148267 A1* | 6/2013 | Takahara | H01G 9/10 277/628 |
| 2014/0098463 A1 | 4/2014 | Bendale et al. | |
| 2017/0047614 A1* | 2/2017 | Sakai | H01M 50/191 |
| 2017/0133645 A1* | 5/2017 | Miyata | H01M 50/119 |
| 2017/0162852 A1* | 6/2017 | Guen | H01M 50/572 |
| 2018/0069200 A1 | 3/2018 | Ono et al. | |

FOREIGN PATENT DOCUMENTS

| | | |
|---|---|---|
| JP | 63-20423 U | 2/1988 |
| JP | 63-51430 U | 4/1988 |
| JP | 2009087729 A | 4/2009 |
| JP | 2012142424 A | 7/2012 |
| JP | 2019046597 A | 3/2019 |
| KR | 20050033432 A | 4/2005 |
| KR | 20120089573 A | 8/2012 |
| KR | 20130006076 A | 1/2013 |
| KR | 20150107171 A | 9/2015 |
| KR | 20190010658 A | 1/2019 |
| RU | 2424595 C1 | 7/2011 |
| RU | 2011127554 A | 1/2013 |

OTHER PUBLICATIONS

Written Opinion for related International Application No. PCT/KR2020/018627; action dated Aug. 19, 2021; (4 pages).
Search Report for related Russian Application No. 2022121920; action dated Dec. 18, 2022; (3 pages).
Office Action for related Japanese Application No. 2022-527846; (4 pages).
Office Action for related Chinese Application No. 202080077845.4; action dated Jun. 11, 2024; (9 pages).
Extended European Search Report for related European Application No. 20918631.1; action dated Feb. 23, 2024; (7 pages).

* cited by examiner

ENERGY STORAGE DEVICE

CROSS-REFERENCE TO RELATED APPLICATIONS

The present application is a National Stage of International Application No. PCT/KR2020/018627 filed on Dec. 18, 2020, which claims the benefit of Korean Patent Application No. 10-2020-0018227, filed on Feb. 14, 2020; and Korean Patent Application No. 10-2020-0172435, filed on Dec. 10, 2020 with the Korean Intellectual Property Office, the entire contents of each hereby incorporated by reference.

FIELD

The present disclosure relates to an energy storage device for storing energy such as electrical energy and the like.

BACKGROUND

Batteries, capacitors, and the like are typical energy storage devices which store electrical energy. Among capacitors, ultra-capacitors (UCs) have high-efficiency, a semi-permanent lifetime, and fast charging and discharging characteristics, and thus UCs form a market of energy storage devices capable of compensating for short cycle and instantaneous high voltage problems which are disadvantages of secondary batteries.

Based on the above-described advantages, UCs are widely used as auxiliary power sources of mobile devices such as mobile phones, tablet personal computers (PCs), and notebook computers, as well as power sources for electric vehicles, hybrid vehicles, and solar cells, which require high capacity, and main power sources or auxiliary power sources of night road lights, uninterrupted power supplies (UPSs), and the like.

Figure 1:
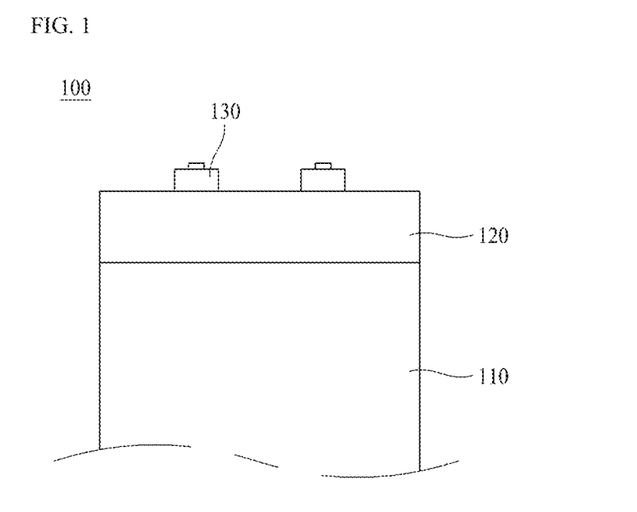
FIG. 1 is a schematic side view illustrating an energy storage device according to a conventional technology.

FIG. 1 is a schematic side view illustrating an energy storage device according to a conventional technology.

Referring to FIG. 1, an energy storage device 100 according to the conventional technology includes a housing 110 for accommodating an electrolyte and an electrode element, a case 120 coupled to one side of the housing 110, and an electrode terminal 130 coupled to the case 120. The electrode terminal 130 is inserted into the case 120 and connected to the electrode element positioned in the housing 110.

In this case, in the energy storage device 100 according to the conventional technology, since a leak of the electrolyte accommodated in the housing 110 occurs through a gap between the case 120 and the electrode terminal 130, there are problems in that the performance of a battery is degraded and a use lifetime is reduced.

SUMMARY

Accordingly, the present disclosure is directed to providing an energy storage device capable of reducing an amount of leakage of an electrolyte.

In order to achieve the above objective, the present disclosure may include the following configurations.

An energy storage device according to one aspect of the present disclosure includes a housing configured to accommodate an electrolyte; an electrode element accommodated in the housing; a case coupled to one side of the housing; and an electrode terminal inserted into the case and electrically connected to the electrode element. The case includes a base part in which a through-hole is formed, the through-hole being configured to allow the electrode terminal to be inserted thereinto; and a sealing part which is coupled to the base part, the sealing part being configured to seal a gap between the base part and the electrode terminal. The sealing part includes a terminal sealing member positioned in the through-hole and pressed against the electrode terminal to seal the gap between the base part and the electrode terminal.

According to the present disclosure, the following effects can be achieved.

The present disclosure can use a sealing part to increase a sealing force for a gap between a case and an electrode terminal. Accordingly, the present disclosure can reduce an amount of leakage of an electrolyte through the gap between the case and the electrode terminal and improve durability against an internal pressure.

DETAILED DESCRIPTION

Hereinafter, an embodiment of an energy storage device according to the present disclosure will be described in detail with reference to the accompanying drawings.

Figure 2:
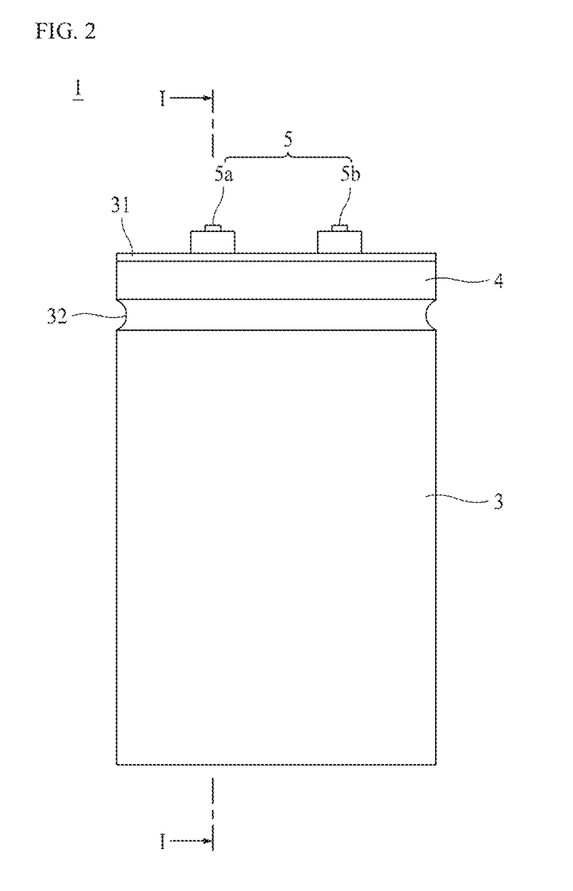
FIG. 2 is a schematic side view illustrating an energy storage device according to the present disclosure.

Referring to FIG. 2, an energy storage device 1 according to the present disclosure is a device for storing electrical energy. The energy storage device 1 according to the present disclosure may be implemented as an ultra-capacitor (UC). The energy storage device 1 according to the present disclosure may include an electrode element 2 (see FIG. 3), a housing 3, a case 4, and electrode terminals 5.

Figure 3:
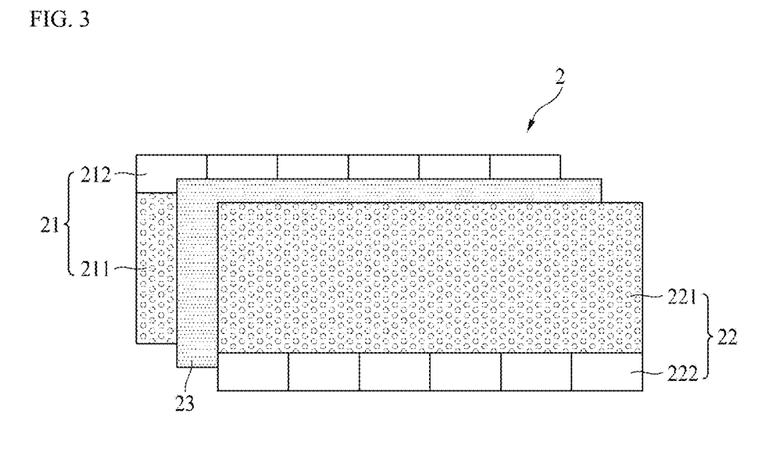
FIG. 3 is a conceptual view for describing an electrode element in the energy storage device according to the present disclosure.

Referring to FIGS. 2 and 3, the electrode element 2 is called a bare cell and may be accommodated in the housing 3. The electrode element 2 may be formed by winding a first electrode 21, a second electrode 22 having a polarity opposite to a polarity of the first electrode 21, and a separator 23, which is disposed between the first electrode 21 and the second electrode 22 and electrically separates the first electrode 21 and the second electrode 22. In one embodiment, when the first electrode 21 has a positive polarity (+), the second electrode 22 has a negative polarity (−). Conversely, when the first electrode 21 has a negative polarity (−), the second electrode 22 has a positive polarity (+).

In FIG. 2, it is illustrated that the separator 23 is positioned only between the first electrode 21 and the second electrode 22, but another separator 23 may be additionally disposed outside the first electrode 21 and the second electrode 22 so that neither the first electrode 21 nor the second electrode 22 is exposed to the outside. For example, in the electrode element 2, the separator 23, the first electrode 21, the separator 23, and the second electrode 22, and the separator 23 may be sequentially disposed and wound. In the electrode element 2, the separator 23, the second electrode 22, the separator 23, the first electrode 21, and the separator 23 may also be sequentially disposed and wound.

The first electrode 21 may include a first active material layer 211, which is formed of activated carbon and formed on a current collector (not shown) formed of a metal material, and a first electrode lead 212 connected to one side of the first active material layer 211. In this case, the first electrode lead 212 is formed as a portion on which the first active material layer 211 is not formed on the current collector.

The second electrode 22 may include a second active material layer 221, which is formed of activated carbon and formed on a current collector (not shown) formed of a metal material, and a second electrode lead 222 connected to one side of the second active material layer 221. In this case, the second electrode lead 222 may be formed as a portion on which the second active material layer 221 is not formed on the current collector.

In the above-described embodiment, the current collectors constituting the first electrode 21 and the second electrode 22 may be formed using metal foils. The current collectors serve as moving paths of electric charges emitted from or supplied to the first active material layer 211 and the second active material layer 221. Each of the first active material layer 211 and the second active material layer 221 may be formed by coating both surfaces of the current collector with first and second active materials. The first active material layer 211 and the second active material layer 221 are layers in which electrical energy is stored.

In one embodiment, in the first electrode 21 and the second electrode 22, the first electrode lead 212 may be wound to be positioned at a lower side of the electrode element 2, and the second electrode lead 222 may be wound to be positioned at an upper side of the electrode element 2.

Meanwhile, the electrode element 2 is impregnated with an electrolyte for storing electrical energy. In this case, a process of impregnating the electrode element 2 with the electrolyte may be performed by soaking the electrode element 2 in the electrolyte filling a container for a predetermined time.

Referring to FIGS. 2 and 3, the housing 3 is a housing which accommodates an electrolyte. Along with the electrolyte, the electrode element 2 may be positioned in the housing 3. The housing 3 may be formed in a shape of which one side is open. For example, the housing 3 may be formed in a shape of which an upper surface is open. The housing 3 may be formed in a substantially cylindrical shape, but is not limited thereto, and may also be formed in a polygonal shape such as a rectangular shape as long as the housing accommodates the electrolyte and the electrode element 2.

Referring to FIGS. 2 to 5, the case 4 is a case coupled to one side of the housing 3. The case 4 may seal one open side of the housing 3. The electrode terminals 5 may be inserted into the case 4. The electrode terminals 5 may be inserted into the case 4 and electrically connected to the electrode element 2 positioned in the housing 3. The case 4 may be formed in substantially a disc shape, but is not limited thereto, and may be formed in a polygonal plate shape such as a quadrangular plate shape as long as the case is capable of sealing one open side of the housing 3.

Figure 4:
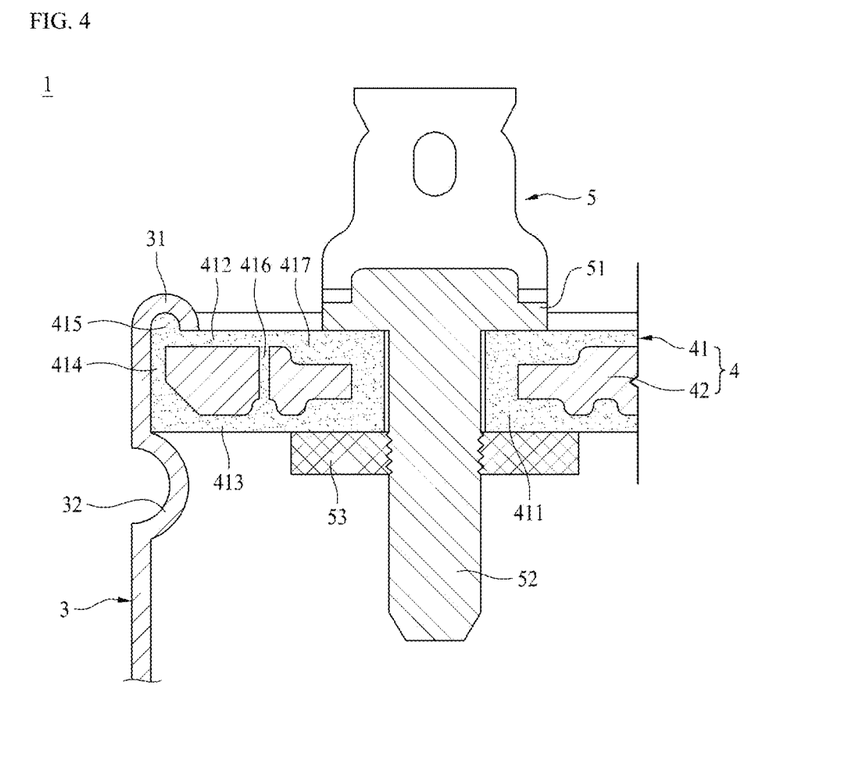
FIG. 4 is a schematic side cross-sectional view that illustrates the energy storage device according to the present disclosure and is taken along line I-I of FIG. 2.
Figure 5:
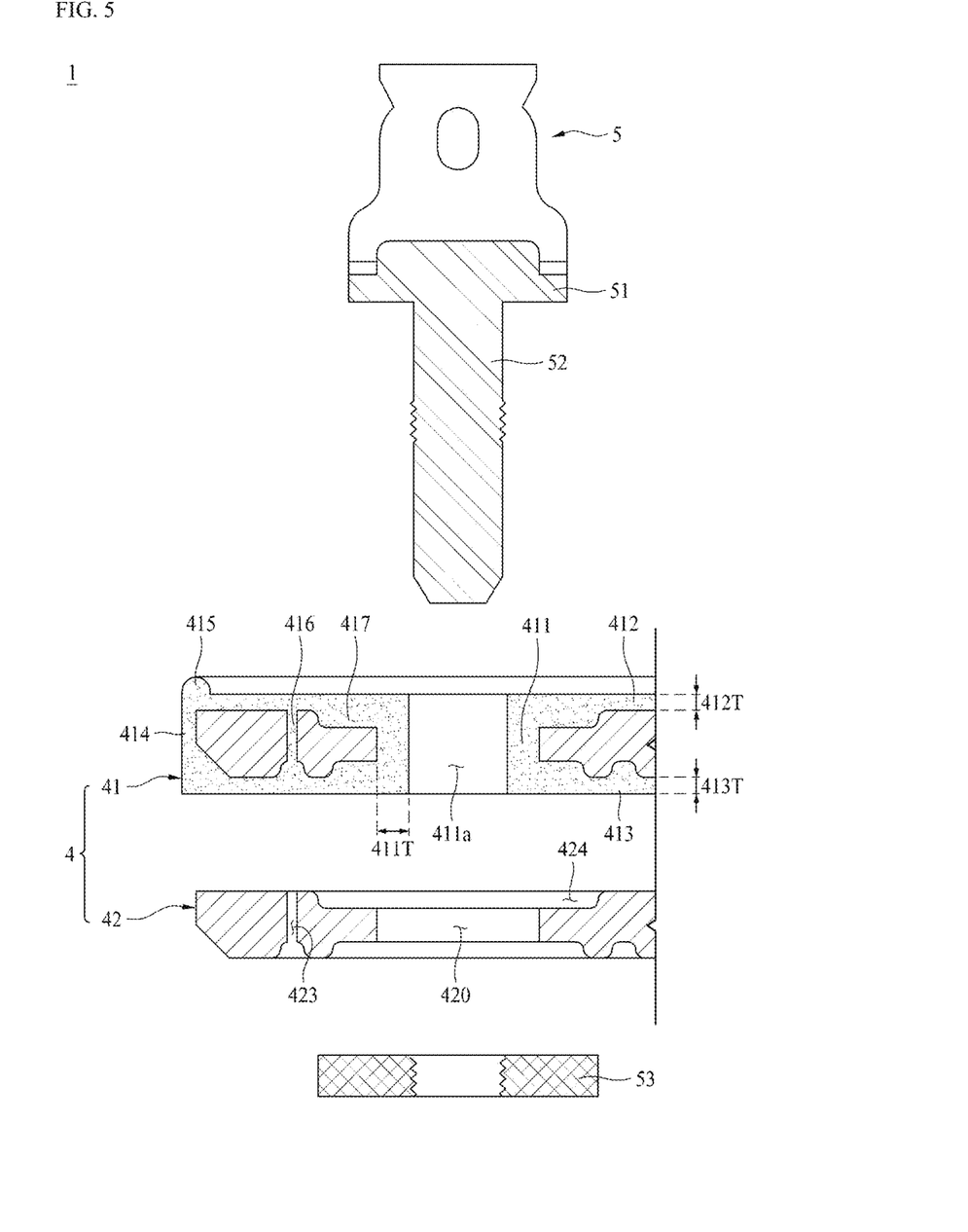
FIG. 5 is an exploded schematic side cross-sectional view illustrating a case and an electrode terminal based on FIG. 4.

The case 4 may include a sealing part 41 and a base part 42.

The sealing part 41 may be coupled to the base part 42. The sealing part 41 may seal a gap between the base part 42 and the electrode terminal 5. The sealing part 41 may also seal a gap between the base part 42 and the housing 3. The sealing part 41 may be coupled to the base part 42 to surround an outer surface of the base part 42. The sealing part 41 may be formed of an elastically deformable material. For example, the sealing part 41 may be formed of rubber, an epoxy resin, a polyimide resin, bismaleimide triazine (BT), an epoxy molding compound (EMC), or the like. The sealing part 41 may be coupled to the base part 42 in an injection molding manner. The sealing part 41 may also be applied on the base part 42 and cured to be coupled to the base part 42.

The sealing part 41 may include a terminal sealing member 411.

The terminal sealing member 411 is a member sealing the gap between the base part 42 and the electrode terminal 5. The terminal sealing member 411 may be positioned in through-holes 420 formed in the base part 42. Accordingly, since the terminal sealing member 411 is positioned inside the through-holes 420, the terminal sealing member 411 may be pressed against the electrode terminal 5 inserted into the case 4. Accordingly, the terminal sealing member 411 may seal the gap between the electrode terminal 5 and the base part 42. Accordingly, the energy storage device 1 according to the present disclosure may reduce an amount of leakage of the electrolyte through the gap between the electrode terminal 5 and the base part 42 by increasing a sealing force for the gap between the electrode terminal 5 and the base part 42 using the sealing part 41. Accordingly, in the energy storage device 1 according to the present disclosure, not only can electrolyte leak prevention performance be improved, but also durability to withstand an internal pressure can be improved through this.

An insertion hole 411a (see FIG. 5) into which the electrode terminal 5 is inserted may be formed in the terminal sealing member 411. The electrode terminal 5 may be inserted into the insertion hole 411a to press the terminal sealing member 411. Accordingly, the terminal sealing member 411 may be strongly pressed against the electrode terminal 5 using a restoring force generated with compression due to a pressing force. The terminal sealing member 411 may be in contact with an entire inner surface of the base part 42 formed toward the through-hole 420. Accordingly, since the energy storage device 1 according to the present disclosure is implemented so that the terminal sealing member 411 is pressed against an entire portion of the electrode terminal 5 inserted into the case 4, leak prevention performance and durability can be further improved.

The sealing part 41 may include an upper surface sealing member 412.

The upper surface sealing member 412 is a member positioned on the upper surface of the base part 42. Accordingly, a sealing force for the upper surface of the base part 42 may be generated due to the upper surface sealing member 412. The upper surface of the base part 42 is a surface positioned at a side opposite to a lower surface of the base part 42 formed toward an inner portion of the housing 3. The upper surface of the base part 42 may be positioned outside the housing 3. The upper surface sealing member 412 and the upper surface of the base part 42 may have substantially the same area. The upper surface sealing member 412 may also have a sufficient area to cover an entire upper surface of the base part 42. The upper surface sealing member 412 and the terminal sealing member 411 may be formed to be connected to each other. The upper surface sealing member 412 and the terminal sealing member 411 may also be formed integrally.

When the upper surface sealing member 412 is provided, the terminal sealing member 411 may have a thickness 411T that is greater than a thickness of the upper surface sealing member 412. That is, the thickness 411T of the terminal sealing member 411 may be greater than a thickness 412T of the upper surface sealing member 412. Accordingly, in the energy storage device 1 according to the present disclosure, the thickness 411T of the terminal sealing member 411 positioned at a portion at which a possibility of generation of leakage is high may be greater. Accordingly, in the energy storage device 1 according to the present disclosure, since the thickness 412T of the upper surface sealing member 412 is relatively thin, an increase in material cost can be suppressed, and at the same time, since the thickness 411T of the terminal sealing member 411 is relatively thick, leak prevention performance can be improved.

The sealing part 41 may include a lower surface sealing member 413.

The lower surface sealing member 413 is a member positioned on the lower surface of the base part 42. Accordingly, a sealing force for the lower surface of the base part 42 may be generated due to the lower surface sealing member 413. The lower surface sealing member 413 and the lower surface of the base part 42 may have substantially the same area. The lower surface sealing member 413 may also have a sufficient area to cover an entire lower surface of the base part 42. The lower surface sealing member 413 and the terminal sealing member 411 may be formed to be connected to each other. The lower surface sealing member 413 and the terminal sealing member 411 may be formed integrally.

When the lower surface sealing member 413 is provided, the terminal sealing member 411 may have a thickness 411T that is greater than a thickness of the lower surface sealing member 413. That is, the thickness 411T of the terminal sealing member 411 may be greater than a thickness 413T of the lower surface sealing member 413. Accordingly, in the energy storage device 1 according to the present disclosure, since the thickness 413T of the lower surface sealing member 413 is relatively thin, an increase in material cost can be suppressed, and at the same time, since the thickness 411T of the terminal sealing member 411 is relatively large, leak prevention performance can be improved.

The sealing part 41 may include a side surface sealing member 414.

The side surface sealing member 414 is a member positioned on a side surface of the base part 42. Accordingly, a sealing force for the side surface of the base part 42 may be generated due to the side surface sealing member 414. The side surface sealing member 414 and the side surface of the base part 42 may have substantially the same area. The side surface sealing member 414 may also have a sufficient area to cover an entire side surface of the base part 42. The side surface sealing member 414 may be formed to be connected to the upper surface sealing member 412 and the lower surface sealing member 413. The side surface sealing member 414, the upper surface sealing member 412, and the lower surface sealing member 413 may also be formed integrally.

The sealing part 41 may include a sealing protrusion 415.

The sealing protrusion 415 is a protrusion supporting a curling member 31 (see FIG. 4) of the housing 3. The sealing protrusion 415 may be inserted into the curling member and support the curling member 31 by catching. Accordingly, the energy storage device 1 according to the present disclosure may improve durability against an internal pressure by increasing a coupling force between the case 4 and the housing 3 using the sealing protrusion 415 and the curling member 31. In addition, since the energy storage device 1 according to the present disclosure may maintain a state in which the sealing part 41 and the housing 3 are pressed against each other using the sealing protrusion 415 and the curling member 31, a sealing force for a gap between the case 4 and the housing 3 may be increased.

The sealing protrusion 415 may protrude upward from the upper surface sealing member 412. The sealing protrusion 415 may be disposed at an edge of the upper surface sealing member 412. In this case, the sealing protrusion 415 may also be formed at a position at which the upper surface sealing member 412 and the side surface sealing member 414 are connected to each other. The sealing protrusion 415 and the upper surface sealing member 412 may also be formed integrally. The curling member 31 may be formed to surround the sealing protrusion 415. Accordingly, the curling member 31 may be hooked on and supported by the sealing protrusion 415 by being thereon. The curling member 31 may be formed to extend from an upper end of the housing 3 and disposed to surround the sealing protrusion 415 through a process of being bent toward the electrode terminal 5 inserted into the case 4. The curling member 31 may be formed to have a curved surface. In this case, the sealing protrusion 415 may have a size that decreases as the sealing protrusion 415 protrudes upward, and an end thereof may be formed to have a curved surface.

In this case, the housing 3 may include a beading member 32 (see FIG. 4). The beading member 32 may protrude to support a lower surface of the case 4. In this case, the curling member 31 may be supported by the sealing protrusion 415 positioned on an upper surface of the case 4. Accordingly, the housing 3 may support the upper surface and the lower surface of the case 4 using the curling member 31 and the beading member 32. Accordingly, the energy storage device 1 according to the present disclosure may be implemented to firmly maintain a state in which the case 4 is coupled to the housing 3. The beading member 32 may support the lower surface sealing member 413. The beading member 32 may also be implemented through a process of bending a part of the housing 3 so that the part protrudes inward.

Referring to FIGS. 2 to 6, the base part 42 is a part to which the sealing part 41 is coupled. The through-holes 420 may be formed in the base part 42. The through-holes 420 may be formed to pass through the base part 42. The plurality of through-holes 420 may be formed in the base part 42. In this case, the plurality of electrode terminals 5 may be inserted into the case 4. The through-holes 420 may be disposed at positions spaced apart from each other.

The base part 42 may have a greater strength than the sealing part 41. Accordingly, the case 4 may be implemented to have a sealing force through the sealing part 41 in addition to having a predetermined strength through the base part 42.

The base part 42 may be implemented to have a higher blocking force than the sealing part 41 against gas. Accordingly, the case 4 may block the electrolyte from leaking in a liquid form using the sealing part 41 in addition to blocking the electrolyte from leaking in a gas form using the base part 42. For example, the base part 42 may be formed of plastic.

Figure 6:
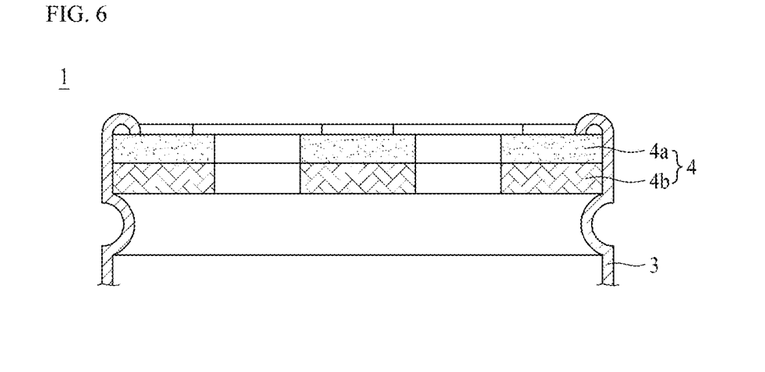
FIG. 6 is a schematic side cross-sectional view illustrating a comparative example of the energy storage device according to the present disclosure.

The base part 42 may be formed of a material having a higher strength than Bakelite and a lower absorptiveness to electrolyte than Bakelite. Accordingly, as illustrated in FIG. 6, the energy storage device 1 according to the present disclosure may be implemented to have improved durability and moisture resistance when compared to a comparative example. This will be specifically described below.

First, the comparative example illustrated in FIG. 6 may be implemented as a structure in which an ethylene propylene diene monomer (EPDM) layer 4a and a Bakelite layer 4b are sequentially stacked. A sealing force may be generated due to the EPDM layer 4a. The EPDM layer 4a may be disposed on only an upper surface of the Bakelite layer 4b. The Bakelite layer 4b is a phenolic plate and serves as a support to achieve sealing and rigidity. In such a comparative example, since the Bakelite layer 4b is formed of a material having similar properties to paper, there is a disadvantage of being susceptible to moisture because the Bakelite layer 4b may absorb an electrolyte. In addition, in the comparative example, since the EPDM layer 4a is disposed on only the upper surface of the Bakelite layer 4b, there is a high possibility that leakage of the electrolyte may occur through a gap between the EPDM layer 4a and the electrode terminal 5.

However, in the embodiment illustrated in FIGS. 4 and 5, since the base part 42 is formed of a material having a higher strength than Bakelite and a lower absorptiveness to the electrolyte than Bakelite at the same time, the case 4 may be implemented to have a greater strength and higher moisture resistance than the comparative example. In addition, in the embodiment, the sealing part 41 is positioned not only on the upper surface, the lower surface, and the side surface of the base part 42 but also in the through-hole 420, and thus an amount of leakage of the electrolyte through the gap between the electrode terminal 5 and the base part 42 can be reduced.

Referring to FIGS. 2 to 8, the base part 42 may include upper surface protrusions 421.

Figure 7:
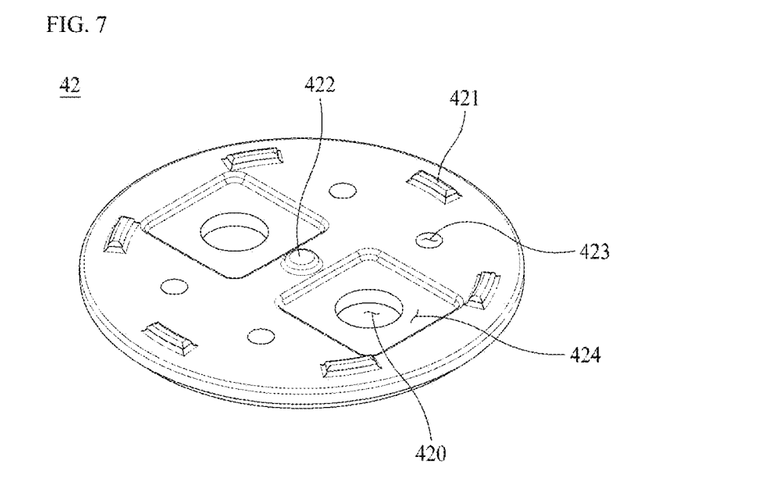
FIG. 7 is a schematic perspective view illustrating a base part of the energy storage device according to the present disclosure.
Figure 8:
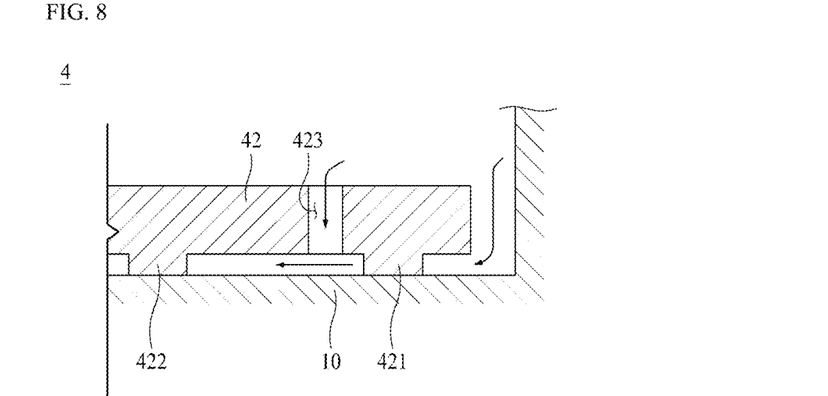
FIG. 8 is a schematic side cross-sectional view for describing a process in which a sealing part is coupled to the base part in the energy storage device according to the present disclosure.

The upper surface protrusions 421 are protrusions protruding from the upper surface of the base part 42. The plurality of upper surface protrusions 421 may be provided on the upper surface of the base part 42. The upper surface protrusions 421 may be disposed apart from each other. When the sealing part 41 is coupled to the base part 42 in the injection molding manner, since the upper surface protrusions 421 are supported by a mold 10 (see FIG. 8), the upper surface of the base part 42 may be spaced apart from the mold 10. In FIG. 8, one surface of the base part 42 facing downward corresponds to the upper surface, and the other surface of the base part 42 facing upward corresponds to the lower surface. As a molding resin for molding the sealing part 41 is introduced between the mold 10 and the upper surface of the base part 42 due to the upper surface protrusions 421, the sealing part 41 may be formed on the upper surface of the base part 42. Accordingly, in the energy storage device 1 according to the present disclosure, a process of forming the sealing part 41 on the upper surface of the base part 42 can be made easier using the upper surface protrusions 421. In addition, in the energy storage device 1 according to the present disclosure, since a contact area between the sealing part 41 and the base part 42 may be increased using the upper surface protrusions 421, a coupling force between the sealing part 41 and the base part 42 may be increased. In FIG. 7, it is illustrated that six upper surface protrusions 421 protrude from the upper surface of the base part 42, but the present disclosure is not limited thereto, and five or fewer, or seven or more upper surface protrusions 421 may protrude from the upper surface of the base part 42. The upper surface protrusions 421 and the base part 42 may also be formed integrally.

Referring to FIGS. 2 to 8, the base part 42 may include a support protrusion 422.

The support protrusion 422 is a protrusion protruding from the upper surface of the base part 42. The support protrusion 422 may protrude from a central portion of the base part 42. When the base part 42 is formed in a disc shape, the support protrusion 422 may protrude from a center of a circle formed by the upper surface of the base part 42. When the sealing part 41 is coupled to the base part 42 in the injection molding manner, even when a molding resin for forming the sealing part 41 is positioned on the lower surface of the base part 42, since the support protrusion 422 is supported by the mold 10 to support the upper surface of the base part 42, the base part 42 may be prevented from sagging. The support protrusion 422 may be formed in substantially a disc shape, but is not limited thereto, and may also be formed in a polygonal shape such as a rectangular shape as long as the support protrusion prevents the base part 42 from sagging.

Referring to FIGS. 2 to 8, the base part 42 may include communication holes 423.

The communication holes 423 are holes formed to pass through the base part 42. When the sealing part 41 is coupled to the base part 42 in the injection molding manner, a molding resin for forming the sealing part 41 may fill the communication holes 423 so that connection sealing members 416 may be formed. The connection sealing members 416 may be formed in the communication holes 423 to connect the upper surface sealing member 412 positioned on the upper surface of the base part 42 and the lower surface sealing member 413 positioned on the lower surface of the base part 42. Accordingly, in the energy storage device 1 according to the present disclosure, the upper surface sealing member 412 and the lower surface sealing member 413 may be prevented from lifting from the base part 42 using the communication holes 423 and the connection sealing members 416. The communication holes 423 may be formed at positions spaced apart from the through-holes 420 to pass through the base part 42. The plurality of communication holes 423 may be formed in the base part 42. The communication holes 423 may be disposed apart from each other. Accordingly, since the sealing part 41 includes the connection sealing members 416 connecting the upper surface sealing member 412 and the lower surface sealing member 413 at separate positions, each of the upper surface sealing member 412 and the lower surface sealing member 413 may increase a prevention force for preventing lifting from the base part 42.

Referring to FIGS. 2 to 7, the base part 42 may include compression grooves 424.

The compression grooves 424 are formed to be connected to the through-holes 420. Each of the compression grooves 424 may be formed as a groove formed to have a predetermined depth from the upper surface of the base part 42. When the compression grooves 424 are provided, the sealing part 41 may include the compression sealing member 417. The compression sealing member 417 may be coupled to the base part 42 to cover the compression groove 424. Accordingly, in the sealing part 41, a portion at which the compression sealing member 417 is positioned may have a greater thickness than other portions. Accordingly, since the electrode terminal 5 may be coupled to the case 4 while compressing the compression sealing member 417, the electrode terminal 5 can be more firmly coupled to the case 4. This is because the electrode terminal 5 may be coupled to the case 4 while more strongly compressing the compression sealing member 417 because the compression sealing member 417 may be deformed by displacement corresponding to the thickness. The compression sealing member 417 may be compressed by a flange 51 included in the electrode terminal 5. When the plurality of electrode terminals 5 are coupled to the case 4, the plurality of compression grooves 424 may be formed in the base part 42.

Referring to FIGS. 2 to 7 and 9, the base part 42 may include a support protrusion 425.

Figure 9:
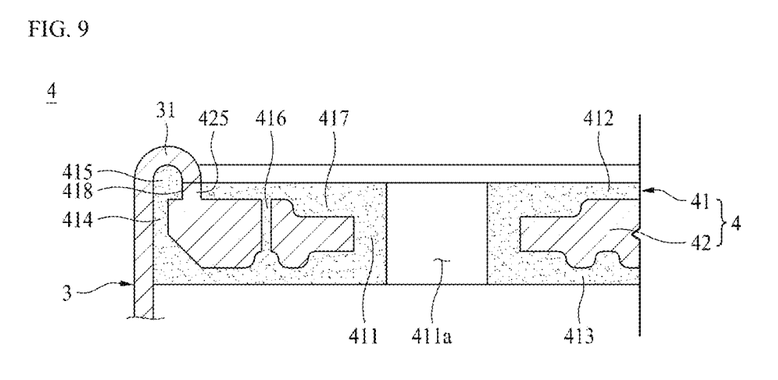
FIG. 9 is a schematic side cross-sectional view for describing the base part including a support protrusion in the energy storage device according to the present disclosure.

The support protrusion 425 is a protrusion supporting the curling member 31. The support protrusion 425 may protrude from the upper surface of the base part 42. When the support protrusion 425 is provided, the sealing part 41 may include a support hole 418. The support hole 418 may be formed to pass through an upper portion of the sealing part 41. In this case, the support hole 418 may be formed to pass through the upper surface sealing member 412. Since the support protrusion 425 is inserted into the support hole 418 and exposed to the outside of the sealing part 41 through the support hole 418, the support protrusion 425 may support the curling member 31 positioned outside the sealing part 41. Accordingly, since the curling member 31 is supported by the support protrusion 425 having a greater strength than the sealing part 41, the curling member 31 may be more firmly supported by the case 4. One surface of the support protrusion 425 supporting the curling member 31 may be formed as a flat surface.

Figure 10:
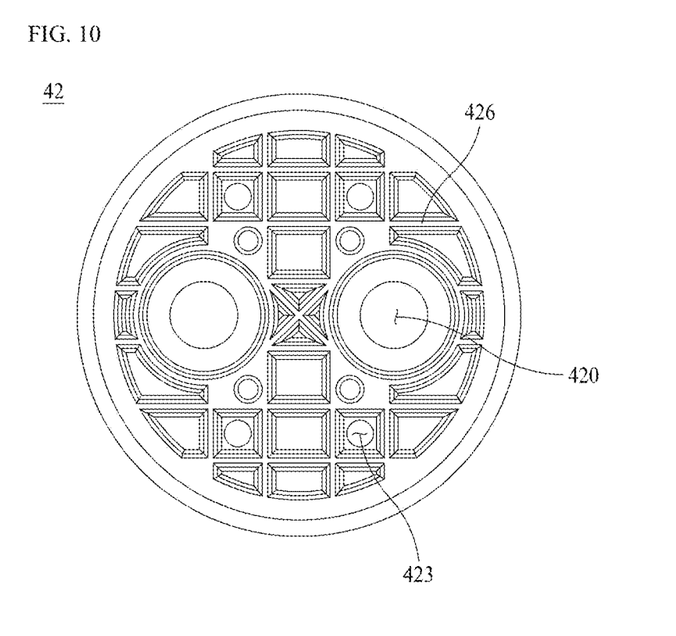
FIG. 10 is a schematic bottom view illustrating the base part of the energy storage device according to the present disclosure.

Referring to FIGS. 2 to 7 and 10, the base part 42 may include reinforcing protrusions 426 (see FIG. 10).

The reinforcing protrusions 426 may protrude from the lower surface of the base part 42. The plurality of reinforcing protrusions 426 may protrude from the lower surface of the base part 42. The reinforcing protrusions 426 may protrude at different positions. Accordingly, in the energy storage device 1 according to the present disclosure, since a strength of the base part 42 may be increased using the reinforcing protrusions 426, durability of the case 4 may be further improved. In addition, in the energy storage device 1 according to the present disclosure, since a contact area between the sealing part 41 and the base part 42 may be increased using the reinforcing protrusions 426, the coupling force between the sealing part 41 and the base part 42 may be increased. Accordingly, in the energy storage device 1 according to the present disclosure, the prevention force for preventing the sealing part 41 from lifting from the base part 42 may be increased. The reinforcing protrusions 426 and the base part 42 may be formed integrally.

In FIG. 10, it is illustrated that the reinforcing protrusions 426 are formed on the lower surface of the base part 42, but the present disclosure is not limited thereto, and the reinforcing protrusions 426 may also be formed on the upper surface of the base part 42. The reinforcing protrusions 426 may also be formed on both of the lower surface and the upper surface of the base part 42. Meanwhile, in FIG. 10, it is illustrated that the reinforcing protrusions 426 are formed in angular shapes and connected to each other, but the present disclosure is not limited thereto, and the reinforcing protrusions 426 may be formed in various shapes as long as the reinforcing protrusions increase the strength of the base part 42.

Referring to FIGS. 2 to 5, the electrode terminal 5 is a terminal inserted into the case 4 and electrically connected to the electrode element 2. The electrode terminal 5 may be inserted into the case 4 through the insertion hole 411a and electrically connected to the electrode element 2 positioned in the housing 3.

The electrode terminal 5 may include the flange 51. The flange 51 may be supported by the upper surface of the case 4. In this case, the flange 51 may compress the compression sealing member 417.

The electrode terminal 5 may include a terminal pin 52. The terminal pin 52 may be inserted into the case 4 and positioned in the housing 3. In this case, the terminal sealing member 411 may be pressed against an outer surface of the terminal pin 52. The terminal pin 52 may be electrically connected to the electrode element 2 positioned in the housing 3.

The electrode terminal 5 may include a coupling member 53. The coupling member 53 may be coupled to the terminal pin 52 protruding from the lower surface of the case 4. Accordingly, the electrode terminal 5 may be coupled to the case 4. The coupling member 53 may be positioned in the housing 3. Threads may be formed in a part of an inner surface of the coupling member 53 and a part of an outer surface of the terminal pin 52.

The electrode terminal 5 may include a first electrode terminal 5a (see FIG. 2) connected to one or more first lead lines (not shown) and a second electrode terminal 5b (see FIG. 2) connected to one or more second lead lines (not shown). The first electrode terminal 5a and the second electrode terminal 5b may be coupled to the case 4 while inserted into the case 4 and electrically connected to the electrode element 2 through the first lead line and the second lead line.

In the energy storage device 1 according to the present disclosure, various types of electrode terminals 5 may be coupled to the case 4. As illustrated in FIG. 2, the electrode terminal 5 implemented with a structure connected to a bus-bar may be coupled to the case 4. In this case, the electrode terminal 5 may be formed in a substantially cylindrical shape. Although not illustrated in the drawings, the electrode terminal 5 implemented with a structure connected to a printed circuit board (PCB) and may also be coupled to the case 4. In this case, the electrode terminal 5 may be formed in a plate shape bent in an "L" shape.

The above-described present disclosure is not limited to the above-described embodiments and the accompanying drawings, and it will be apparent to those skilled in the art that various substitutions, modifications, and changes are possible without departing from the technical spirit of the embodiment.

The invention claimed is:
1. An energy storage device comprising:
a housing configured to accommodate an electrolyte;
an electrode element accommodated in the housing;
a case coupled to one side of the housing; and
an electrode terminal inserted into the case and electrically connected to the electrode element,
wherein:
the case includes: a base part in which a through-hole is formed, the through-hole being configured to allow the electrode terminal to be inserted thereinto; and a sealing part coupled to the base part, the sealing part being configured to seal a gap between the base part and the electrode terminal, the housing includes a curling member hooked on and supported by the sealing part, the sealing part includes a terminal sealing member positioned in the through-hole and pressed against the electrode terminal to seal the gap between the base part and the electrode terminal, an upper surface sealing member positioned on an upper surface of the base part, and a sealing protrusion protruding upward from the upper surface sealing member, the sealing protrusion is inserted into the curling member and supports the curling member by catching, and an inner surface of the curling member directly contacts the sealing protrusion.

2. The energy storage device of claim 1, wherein the sealing part includes:

a side surface sealing member positioned on a side surface of the base part; and a lower surface sealing member positioned on a lower surface of the base part.

3. The energy storage device of claim 1, wherein: the terminal sealing member is formed to have a greater thickness than the upper surface sealing member.

4. The energy storage device of claim 1, wherein the base part is formed of a material having a greater strength than Bakelite and lower absorptiveness to the electrolyte than Bakelite.

5. The energy storage device of claim 1, comprising:

a plurality of upper surface protrusions protruding from an upper surface of the base part; and the upper surface protrusions are disposed apart from each other.

6. The energy storage device of claim 1, comprising a support protrusion protruding from a central portion of an upper surface of the base part.

7. The energy storage device of claim 1, comprising a communication hole formed to pass through the base part, wherein the sealing part includes:

a lower surface sealing member positioned on a lower surface of the base part; and a connection sealing member formed in the communication hole to connect the upper surface sealing member and the lower surface sealing member.

8. The energy storage device of claim 1, wherein:

the base part includes a support protrusion which supports the curling member; the sealing part includes a support hole into which the support protrusion is inserted; and the support protrusion is exposed to the outside of the sealing part through the support hole and supports the curling member.

9. The energy storage device of claim 1, wherein:

the curling member is supported by the sealing protrusion positioned on an upper surface of the case; and the housing includes a beading member protruding to support a lower surface of the case.

10. The energy storage device of claim 1, wherein:

the base part includes a compression groove formed to be connected to the through-hole; the sealing part includes a compression sealing member coupled to the base part to cover the compression groove; and the compression sealing member is compressed by the electrode terminal coupled to the case.

11. The energy storage device of claim 1, comprising a plurality of reinforcing protrusions protruding from at least one of an upper surface of the base part and a lower surface of the base part.

* * * * *